United States Patent
Rana

(10) Patent No.: US 11,741,201 B2
(45) Date of Patent: Aug. 29, 2023

(54) SYSTEMS AND METHODS FOR INITIATING AN AUTHENTICATED SESSION

(71) Applicant: The Toronto-Dominion Bank, Toronto (CA)

(72) Inventor: Nisha Rana, Mississauga (CA)

(73) Assignee: The Toronto-Dominion Bank, Toronto (CA)

(*) Notice: Subject to any disclaimer, the term of this patent is extended or adjusted under 35 U.S.C. 154(b) by 472 days.

(21) Appl. No.: 17/015,205

(22) Filed: Sep. 9, 2020

(65) Prior Publication Data

US 2022/0075853 A1    Mar. 10, 2022

(51) Int. Cl.
| | |
|---|---|
| *G06F 21/31* | (2013.01) |
| *H04L 9/40* | (2022.01) |
| *G06F 21/45* | (2013.01) |
| *H04L 51/58* | (2022.01) |
| *G06F 21/00* | (2013.01) |

(52) U.S. Cl.
CPC .......... *G06F 21/313* (2013.01); *G06F 21/45* (2013.01); *H04L 63/0846* (2013.01); *H04L 63/0861* (2013.01); *H04L 51/58* (2022.05)

(58) Field of Classification Search
CPC .......... G06F 21/45; G06F 21/44; G06F 21/31; G06F 21/34; G06F 21/42; G06F 21/32; H04L 63/0846; H04L 63/0861
See application file for complete search history.

(56) References Cited

U.S. PATENT DOCUMENTS

| | | |
|---|---|---|
| 9,231,937 B2 | 1/2016 | Cao |
| 9,355,231 B2 | 5/2016 | Disraeli |
| 9,380,057 B2 | 6/2016 | Knauss |
| 10,528,946 B2 | 1/2020 | Ye et al. |
| 2007/0255620 A1 | 11/2007 | Tumminaro et al. |
| 2009/0249454 A1 | 10/2009 | Yamamoto et al. |
| 2014/0304172 A1* | 10/2014 | Kirillin .................. G06Q 20/40 705/71 |
| 2018/0247296 A1* | 8/2018 | Win ..................... G06Q 20/385 |

FOREIGN PATENT DOCUMENTS

KR    20180109027 A    10/2018

OTHER PUBLICATIONS

Cestaro: "Soon you can use Whatsapp to receive two-factor authentication codes", retrieved from https://reclaimthenet.org/whatsapp-2-factor-authentication-codes/, published on May 1, 2019.

* cited by examiner

*Primary Examiner* — Edward Zee
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to send, via the communications module and to a remote computing device, a signal causing the remote computing device to display a unique code and a telephone number; monitor at least one instant messaging account associated with the telephone number for the unique code; after determining that the unique code has been received at the at least one instant messaging account associated with the displayed telephone number, determine that authentication for a particular account has been successful; and in response to determining that authentication for the particular account has been successful, initiate an authenticated session.

20 Claims, 13 Drawing Sheets

SYSTEMS AND METHODS FOR INITIATING AN AUTHENTICATED SESSION

TECHNICAL FIELD

The present disclosure relates to user authentication and, in particular, to systems and methods for initiating an authenticated session.

BACKGROUND

Two-factor or second factor authentication is often performed using a telephone number associated with an account. For example, after a user successfully inputs a username and password combination, a code may be sent to a pre-registered telephone number via Short Message Server (SMS) or telephone call. The user is asked to enter the code to prove they have access to the registered telephone number.

The use of a telephone number as a second authentication factor has some drawbacks. For example, a user may be unable to authenticate when they do not have active telephone service on their mobile device or when they have a new telephone number that has not yet been registered with the account.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
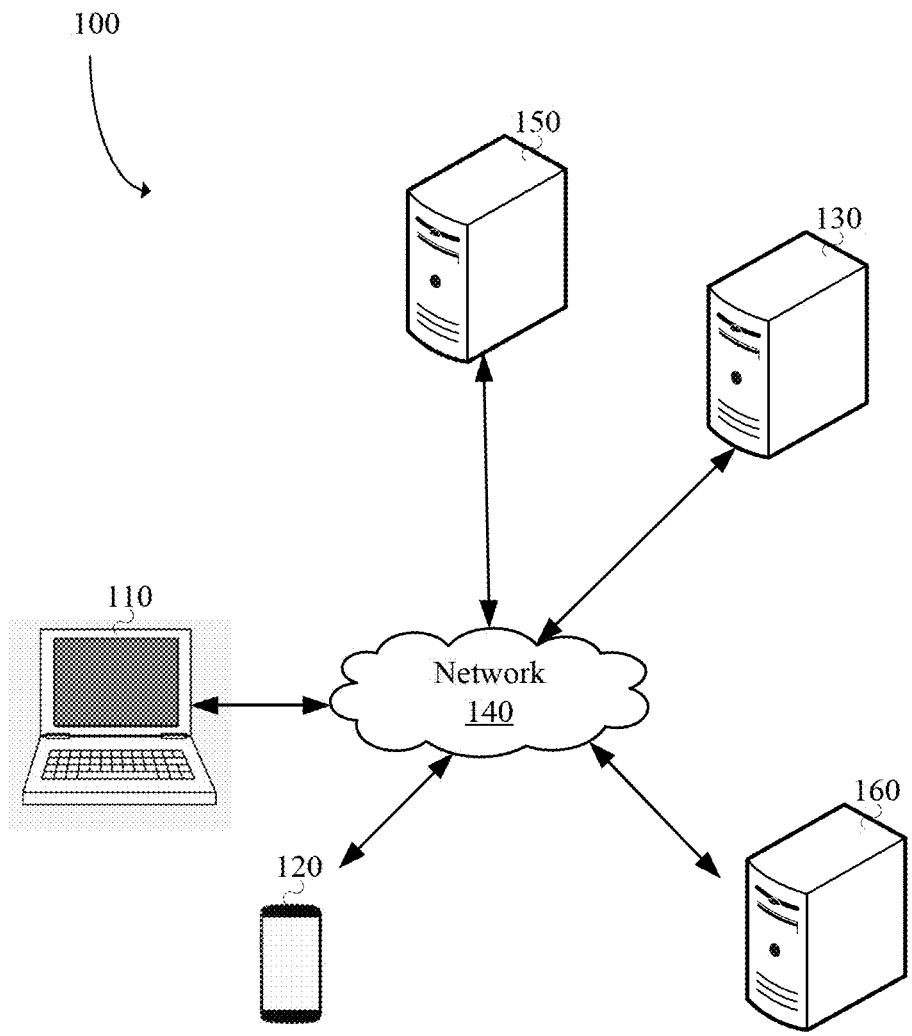
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to send, via the communications module and to a remote computing device, a signal causing the remote computing device to display a unique code and a telephone number; monitor at least one instant messaging account associated with the telephone number for the unique code; after determining that the unique code has been received at the at least one instant messaging account associated with the displayed telephone number, determine that authentication for a particular account has been successful; and in response to determining that authentication for the particular account has been successful, initiate an authenticated session.

In one or more embodiments, the authentication includes a two-factor authentication and the signal causing the remote computing device to display the unique code and the telephone number is sent after a successful first factor authentication of the particular account.

In one or more embodiments, the first factor authentication includes receiving one or more credentials associated with the particular account, the one or more credentials including at least one of a username, a password, a fingerprint scan and a facial scan.

In one or more embodiments, the processor-executable instructions, when executed by the processor, further configure the processor to send, via the communications module and to the remote computing device, a signal causing the remote computing device to display the unique code for a predefined amount of time, and after the predefined amount of time, send, via the communications module and to the remote computing device, a signal causing the remote computing device to display a new unique code.

In one or more embodiments, the processor-executable instructions, when executed by the processor, further configure the processor to add the unique code to a list of active unique codes; and remove the unique code from the list of active unique codes in response to one of determining that authentication for the particular account has been successful; and an expiry of a predefined amount of time.

In one or more embodiments, the processor-executable instructions, when executed by the processor, further configure the processor to after determining that the unique code has been received at the at least one instant messaging account associated with the displayed telephone number, determine that the unique code was received from an instant messaging account associated with a telephone number registered with the particular account.

In one or more embodiments, the authentication for the particular account is determined to be successful in response to determining that the unique code was received from the instant messaging account associated with the telephone number registered with the particular account.

In one or more embodiments, the processor-executable instructions, when executed by the processor, further configure the processor to after determining that the unique code has been received at the at least one instant messaging account associated with the displayed telephone number, determine that the unique code was not received from an instant messaging account associated with a telephone number registered with the particular account; and in response to determining that the unique code was not received from an instant messaging account associated with a telephone number registered with the particular account, send one or more proof-of-identity questions to the instant messaging account from which the unique code was sent.

In one or more embodiments, the one or more proof-identity questions are sent within a chat interface between the at least one instant messaging account associated with the displayed telephone number and the instant messaging account from which the unique code was sent.

In one or more embodiments, determining that the authentication for the particular account has been successful is performed in response to successful verification of one or more answers to the one or more proof-of-identity questions.

According to another aspect there is provided a computer-implemented method comprising sending, via a communications module and to a remote computing device, a signal causing the remote computing device to display a unique code and a telephone number; monitoring at least one instant messaging account associated with the telephone number for the unique code; after determining that the unique code has been received at the at least one instant messaging account associated with the displayed telephone number, determining that authentication for a particular account has been successful; and in response to determining that authentication for the particular account has been successful, initiating an authenticated session.

In one or more embodiments, the authentication includes a two-factor authentication and the signal causing the remote computing device to display the unique code and the telephone number is sent after a successful first factor authentication of the particular account.

In one or more embodiments, the first factor authentication includes receiving one or more credentials associated with the particular account, the one or more credentials including at least one of a username, a password, a fingerprint scan and a facial scan.

In one or more embodiments, the method further comprises sending, via the communications module and to the remote computing device, a signal causing the remote computing device to display the unique code for a predefined amount of time; and after the predefined amount of time, sending, via the communications module and to the remote computing device, a signal causing the remote computing device to display a new unique code.

In one or more embodiments, the method further comprises after determining that the unique code has been received at the at least one instant messaging account associated with the displayed telephone number, determining that the unique code was received from an instant messaging account associated with a telephone number registered with the particular account.

In one or more embodiments, the authentication for the particular account is determined to be successful in response to determining that the unique code was received from the instant messaging account associated with the telephone number registered with the particular account.

In one or more embodiments, the method further comprises after determining that the unique code has been received at the at least one instant messaging account associated with the displayed telephone number, determining that the unique code was not received from an instant messaging account associated with a telephone number registered with the particular account; and in response to determining that the unique code was not received from an instant messaging account associated with a telephone number registered with the particular account, sending one or more proof-of-identity questions to the instant messaging account from which the unique code was sent.

In one or more embodiments, the one or more proof-identity questions are sent within a chat interface between the at least one instant messaging account associated with the displayed telephone number and the instant messaging account from which the unique code was sent.

In one or more embodiments, determining that the authentication for the particular account has been successful is performed in response to successful verification of one or more answers to the one or more proof-of-identity questions.

According to another aspect there is provided a non-transitory computer readable storage medium comprising computer-executable instructions which, when executed, configure a processor to send, via a communications module and to a remote computing device, a signal causing the remote computing device to display a unique code and a telephone number; monitor at least one instant messaging account associated with the telephone number for the unique code; after determining that the unique code has been received at the at least one instant messaging account associated with the displayed telephone number, determine that authentication for a particular account has been successful; in response to determining that authentication for the particular account has been successful, initiate an authenticated session.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

The present disclosure provides techniques for two-factor or second factor authentication. In embodiments, systems and methods are described for initiating an authenticated session using two-factor authentication. In some embodiments, a unique code and a telephone number may be displayed at a remote computing device. At least one instant messaging account associated with the telephone number is monitored for the unique code. After determining that the unique code has been received by the at least one instant messaging account associated with the displayed telephone number, authentication for a particular account is determined to be successful and an authenticated session is initiated.

FIG. 1 is a schematic operation diagram illustrating an operating environment of an example embodiment. FIG. 1 illustrates a system 100 for initiating an authenticated session using two-factor authentication.

As shown, computing devices 110, 120 and a server 130 communicate via a network 140. The computing devices 110, 120 may be referred to as remote computing devices and may be associated with a user.

The server 130 may be referred to as an authentication server 130 and may be configured to authenticate a user using two-factor authentication. The authentication server 130 may store authorization data, such as a stored secret or stored identifying data, and associate the authorization data with an account of the user. The authentication server 130 may store identity data associated with the user such as for example a name, telephone number, email address, etc. For each user, the authentication server 130 may store one or more proof-of-identity questions and corresponding answers.

The authentication server 130 is configured to complete first factor authentication of a user based on authorization information such as a secret (e.g., a password, a personal identification number, etc.), or other identifying data such as, for example, biometric data such as a fingerprint. The authorization information is input at one of the computing devices 110, 120 and a representation of the authorization information is provided to the authentication server 130. The authentication server 130 may access the stored authorization data to validate the authorization information input by the user at one of the computing devices 110, 120. The authentication server 130 may determine that the user is a particular user and may determine that the first factor authentication is successful if the authorization information matches the stored authorization data. As will be described in more detail below, after the first factor authentication is successful, the authentication server 130 is configured to conduct a second factor authentication and, when the second factor authentication is successful, the authentication server 130 may initiate an authenticated session.

The authentication server 130 may be connected to a data resource such as for example a computer system that includes one or more database servers, computer servers, and the like. The protected data resource may be for example an application programming interface (API) for a web-based system, operating system, database system, computer hardware, or software library.

The system 100 includes a financial institution server 150. The authentication server 130 may be associated with a financial institution and may be engaged or connected with the financial institution server 150. The financial institution server 150 may maintain customer bank accounts. For example, the financial institution server 150 may maintain a database that includes various data records. A data record may, for example, reflect an amount of value stored in a particular account associated with a user. The authentication server 130 may be configured to initiate an authenticated session with the financial institution server 150.

The system 100 also includes at least one application server 160. The application server 160 may be associated with a third-party application (such as a web or mobile application) that is resident on the computing device 110, the computing device 120, the authentication server 130 and/or an API. For example, the application server 160 may connect the computing device 110 to a back-end system associated with the third-party application. The capabilities of the application server 160 may include, among others, user management, data storage and security, transaction processing, resource pooling, push notifications, messaging, and off-line support of the third-party application. The application server 160 is connected to the computing device 110, the computing device 120, and the authentication server 130 via the network 140.

The computing device 110, the computing device 120, the authentication server 130, the financial institution server 150 and the application server 160 may be in geographically disparate locations. Put differently, the computing device 110, the computing device 120, the authentication server 130, the financial institution server 150 and the application server 160 may be remote from one another.

The computing device 110, the computing device 120, the authentication server 130, the financial institution server 150 and the application server 160 are computer systems. The computing devices 110, 120 may each take a variety of forms including, for example, a mobile communication device such as a smartphone, a tablet computer, a wearable computer such as a head-mounted display or smartwatch, a laptop or desktop computer, or a computing device of another type. In certain embodiments, a user may operate the computing device 110 and/or the computing device 120 to cause the computing device 110 and/or the computing device 120 to perform one or more operations consistent with the disclosed embodiments. The computing devices 110, 120 may be associated with the same user.

The network 140 is a computer network. In some embodiments, the network 140 may be an internetwork such as may be formed of one or more interconnected computer networks. For example, the network 140 may be or may include an Ethernet network, an asynchronous transfer mode (ATM) network, a wireless network, a telecommunications network or the like.

Operations associated with the authentication server 130 will be described in greater detail below.

Figure 2:
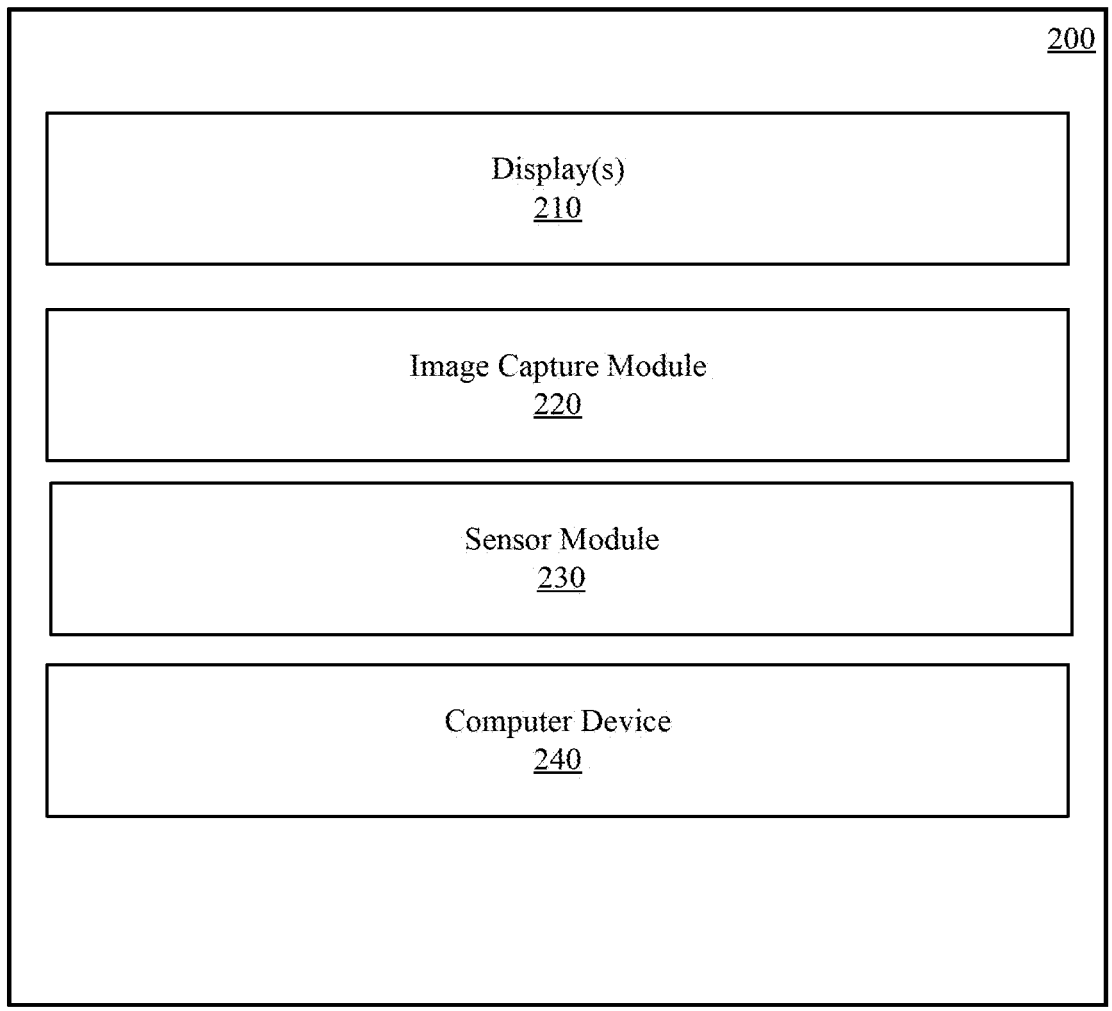
FIG. 2 is a simplified schematic diagram showing components of a computing device.

FIG. 2 is a simplified schematic diagram showing component of an exemplary computing device 200. Computing devices 110, 120 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the authentication server 130, the financial institution server 150 and the application server 160 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
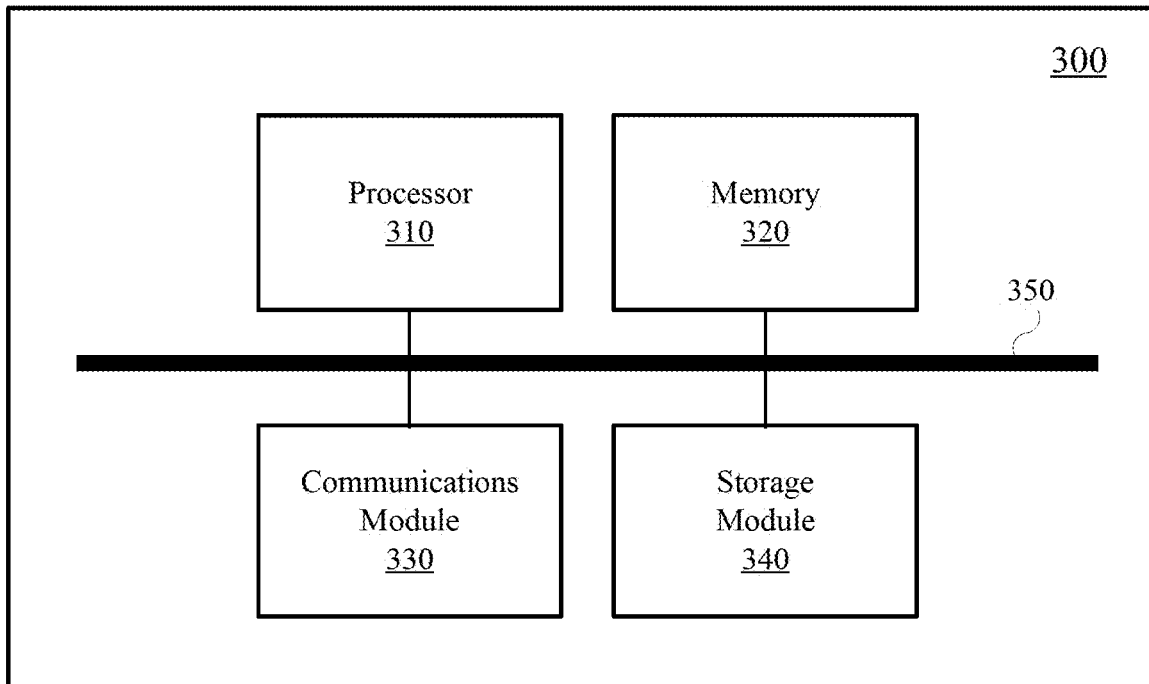
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the authentication server 130, the financial institution server 150 and/or the application server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
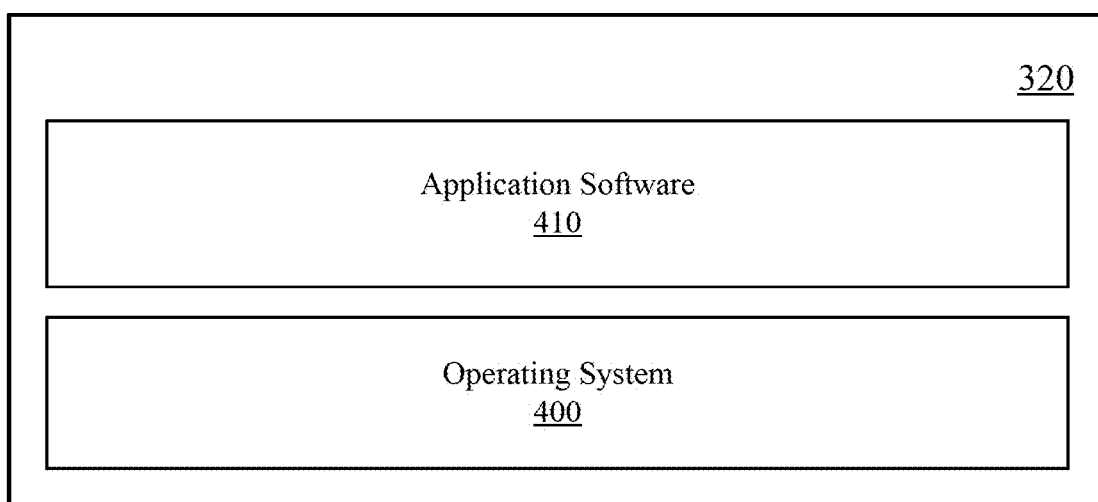
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of computing device 110 or computing device 120 (FIG. 1), the authentication server 130, the financial institution server 150 and/or the application server 160.

While a single application 410 is illustrated in FIG. 3, in operation the memory 320 may include more than one application 410 and different applications 410 may perform different operations. For example, in at least some embodiments in which the computer device 300 is functioning as one of the computing devices 110, 120, the applications 410 may include a banking application. The banking application may be configured for secure communications with the authentication server 130 and/or the financial institution server 150 and may provide various banking functions such as, for example, the ability to display a quantum of value in one or more data records (e.g. display balances), configure transfers of data (e.g. bill payments and other transfers), adding authorized users to the account and other account management functions.

By way of further examples, in at least some embodiments in which the computer device 300 functions as the one of the computing devices 110, 120, the applications 410 may include a web browser, which may also be referred to as an Internet browser. In at least some such embodiments, the financial institution server 150 may be a web server that may serve one or more of the interfaces described herein. The web servers may cooperate with the web browser and may serve as an interface when the interface is requested through the web browser. For example, the web browser may serve as a mobile banking interface.

By way of further example, in at least some embodiments in which the computer device 300 functions as one of the computing devices 110, 120, the applications 410 may include an electronic instant messaging application. The electronic instant messaging application may be configured to exchange electronic instant messages within a chat interface with other computing devices such as for example the authentication server 130.

Embodiments of operations performed by the authentication server 130 will now be described.

In the following embodiments, authentication is required when a user opens a particular mobile application or visits a particular webpage using the computing device 110. The mobile application or webpage may be associated with the financial institution. The authentication server 130 is configured to authenticate the user using two-factor authentication. The two-factor authentication may be performed by the user using the computing device 110 or with the assistance of the computing device 120, as will be described.

Figure 5:
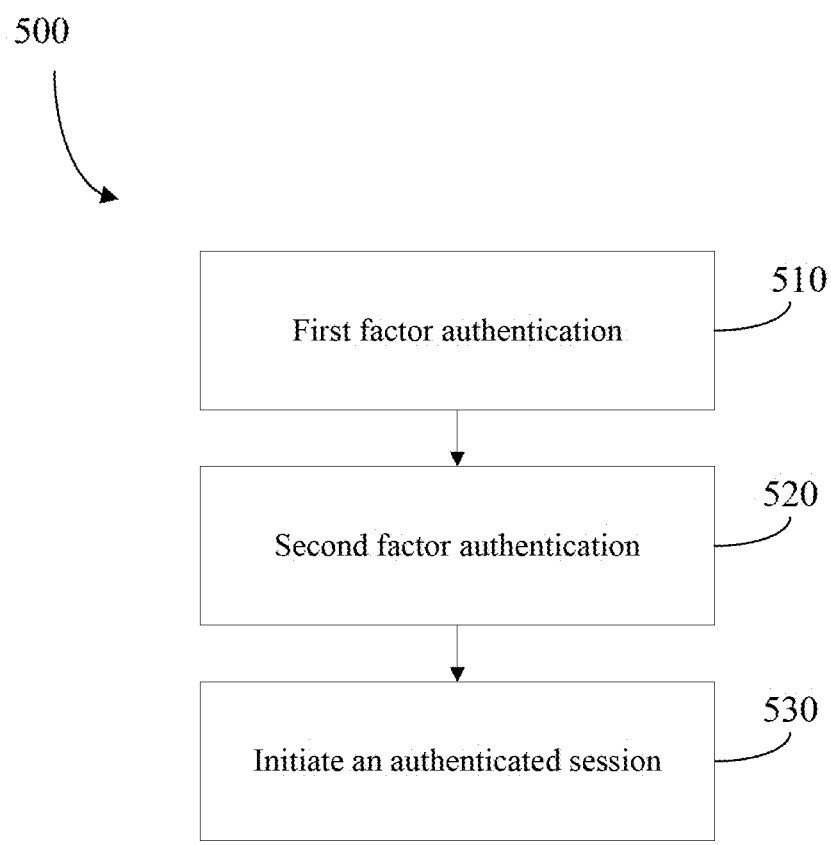
FIG. 5 is a flowchart showing operations performed by a server in initiating an authenticated session according to an embodiment.

FIG. 5 is a flowchart showing operations performed by the authentication server 130 according to an embodiment. The operations may be included in a method 500 which may be performed by the authentication server 130. For example, computer-executable instructions stored in memory of the authentication server 130 may, when executed by a processor of the authentication server 130, configure the authentication server 130 to perform the method 500 or a portion thereof.

The authentication server 130 performs a first factor authentication (step 510). In this embodiment, the first factor authentication is based on authorization information such as a secret (e.g., a password, a personal identification number, etc.), or other identifying data such as, for example, biometric data such as a fingerprint. In this embodiment, the authorization information is input at the computing device 110 and a representation of the authorization information is sent to the authentication server 130.

Figure 6:
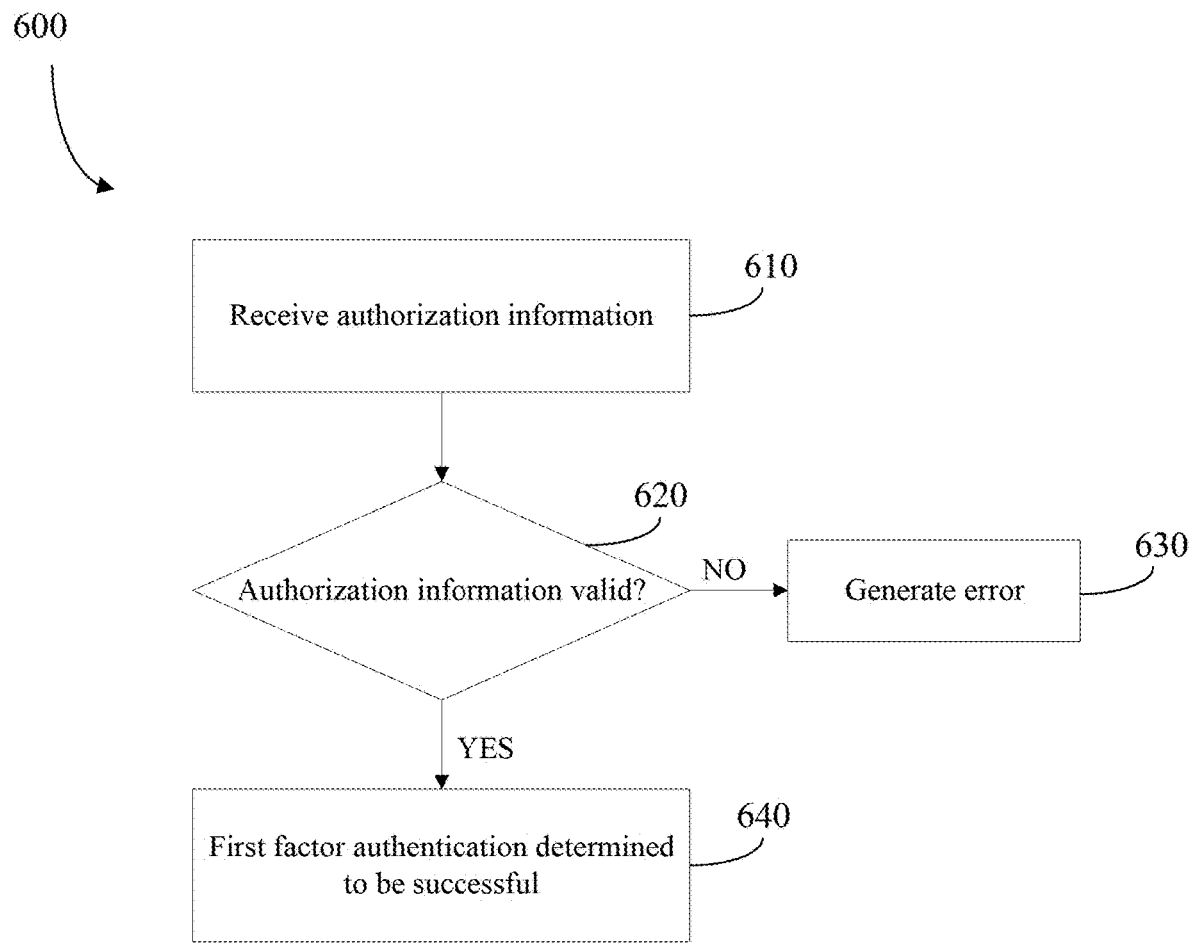
FIG. 6 is a flowchart showing operations performed by a server in performing a first factor authentication according to an embodiment.

FIG. 6 is a flowchart showing operations performed by the authentication server 130 to perform the first factor authentication according to an embodiment. The operations may be included in a method 600 which may be performed by the authentication server 130. For example, computer-executable instructions stored in memory of the authentication server 130 may, when executed by a processor of the authentication server 130, configure the authentication server 130 to perform the method 600 or a portion thereof.

The authentication server 130 receives, via the communications module and from the computing device 110, the representation of the authorization information (step 610). The authorization information may be a secret (e.g., a password, a personal identification number, etc.) or other identifying data such as for example biometric data such as a fingerprint.

The authentication server 130 determines if the authorization information is valid (step 620). In this embodiment, the authentication server 130 accesses stored authorization data and compares the authorization information to the stored authorization data. When the authorization information does not match the stored authorization data, the authentication server 130 generates an error (step 630). The error may cause the computing device 110 to display a message to the user indicating that the authorization information is not valid and may prompt the user to enter correct authorization information again.

When the authorization information matches the stored authorization data, the authorization information is validated and the first factor authentication is determined to be successful (step 640). The user is thus identified and the authentication server 130 may retrieve stored identity data associated with the user such as for example a name, telephone number, email address, etc.

Figure 7:
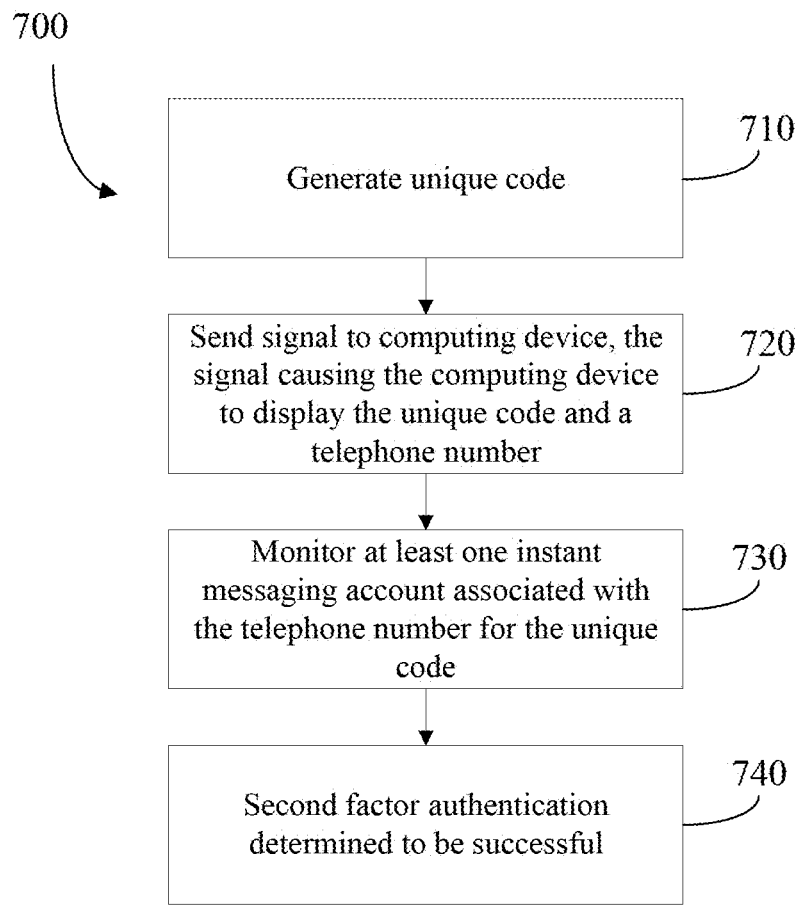
FIG. 7 is a flowchart showing operations performed by a server in performing a second factor authentication according to an embodiment.

Referring back to FIG. 5, after the first factor authentication is successful, the authentication server 130 performs a second factor authentication (step 520). FIG. 7 is a flowchart showing operations performed by the authentication server 130 to perform the second factor authentication according to an embodiment. The operations may be included in a method 700 which may be performed by the authentication server 130. For example, computer-executable instructions stored in memory of the authentication server 130 may, when executed by a processor of the authentication server 130, configure the authentication server 130 to perform the method 700 or a portion thereof.

Figure 8:
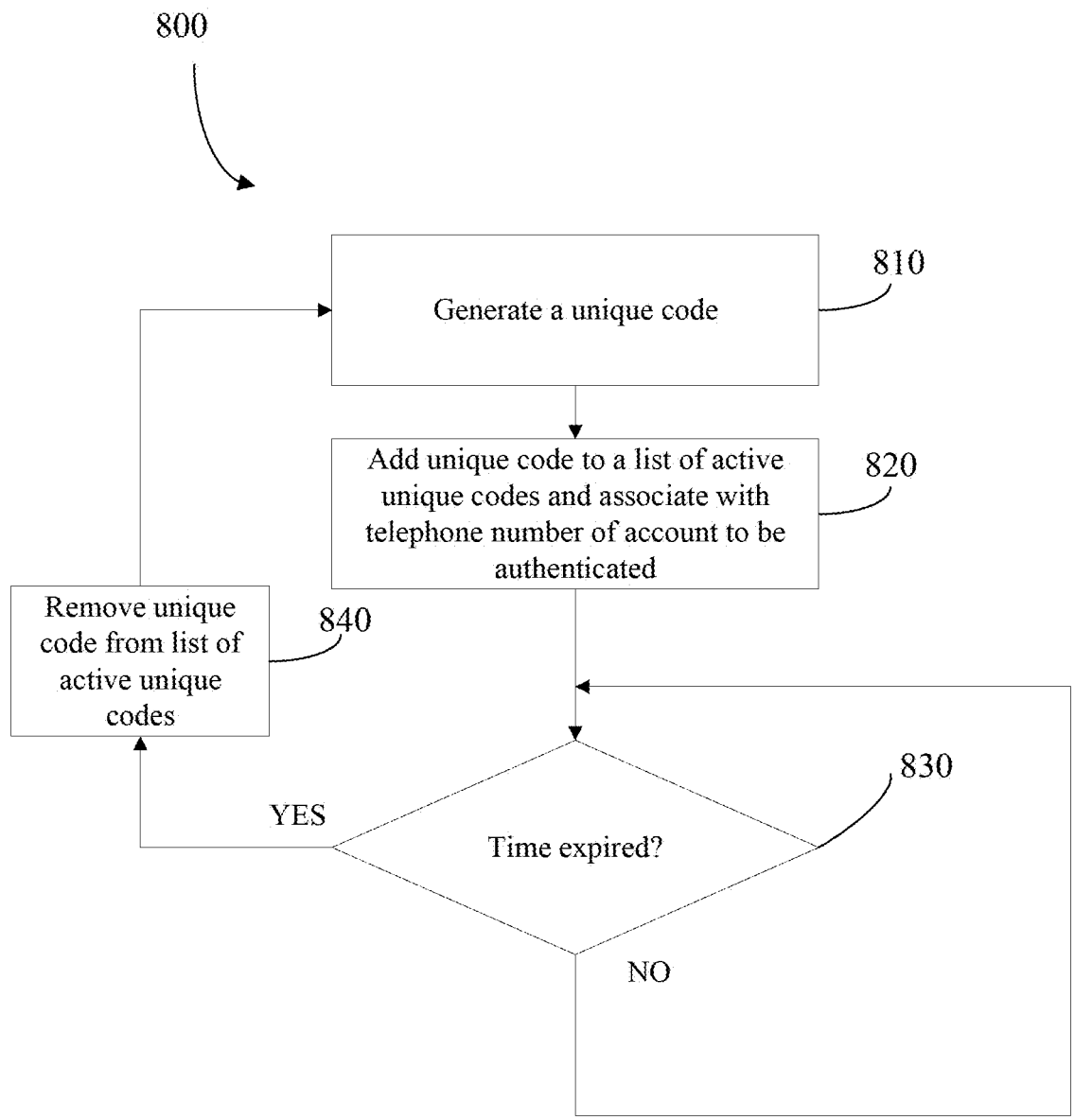
FIG. 8 is a flowchart showing operations performed by a server in generating a unique code according to an embodiment.

During method 700, the authentication server 130 generates a unique code (step 710). FIG. 8 is a flowchart showing operations performed by the authentication server 130 to generate a unique code according to an embodiment. The operations may be included in a method 800 which may be performed by the authentication server 130. For example, computer-executable instructions stored in memory of the authentication server 130 may, when executed by a processor of the authentication server 130, configure the authentication server 130 to perform the method 800 or a portion thereof.

During method 800, the authentication server 130 generates a unique code using a random number generator (step 810). The unique code may be, for example, a six-digit code consisting of numeric or alpha-numeric characters.

The unique code is added to a list of active unique codes and is associated with a telephone number of the account to be authenticated (step 820). In this embodiment, the telephone number of the account to be authenticated is obtained from the identity data retrieved during the first factor authentication.

In this embodiment, the unique code is assigned a predefined amount of time indicating how long the unique code is active. The predefined amount of time may be for example 30 seconds.

A check is performed to determine if the predefined amount of time has expired (step 830). If the predefined amount of time has not expired, the unique code remains active and as such remains on the list of active unique codes.

When the predefined amount of time has expired, the unique code is removed from the list of active unique codes (step 840) and the method returns to step 810 where a new unique code is generated and send for display on the computing device 110.

Referring back to FIG. 7, the authentication server 130 sends, via the communications module and to the computing device 110, a signal causing the computing device 110 to display the unique code generated during step 710 and a telephone number (step 720). In response, the computing device 110 displays the unique code and the telephone number. The telephone number may be a telephone number registered to the authentication server 130 or may be a telephone number registered with the financial institution associated with the authentication server 130. In this embodiment, the telephone number is associated with a number of instant messaging accounts for the authentication server 130. It will be appreciated that the telephone number may be associated with a single instant messaging account.

Figure 9:
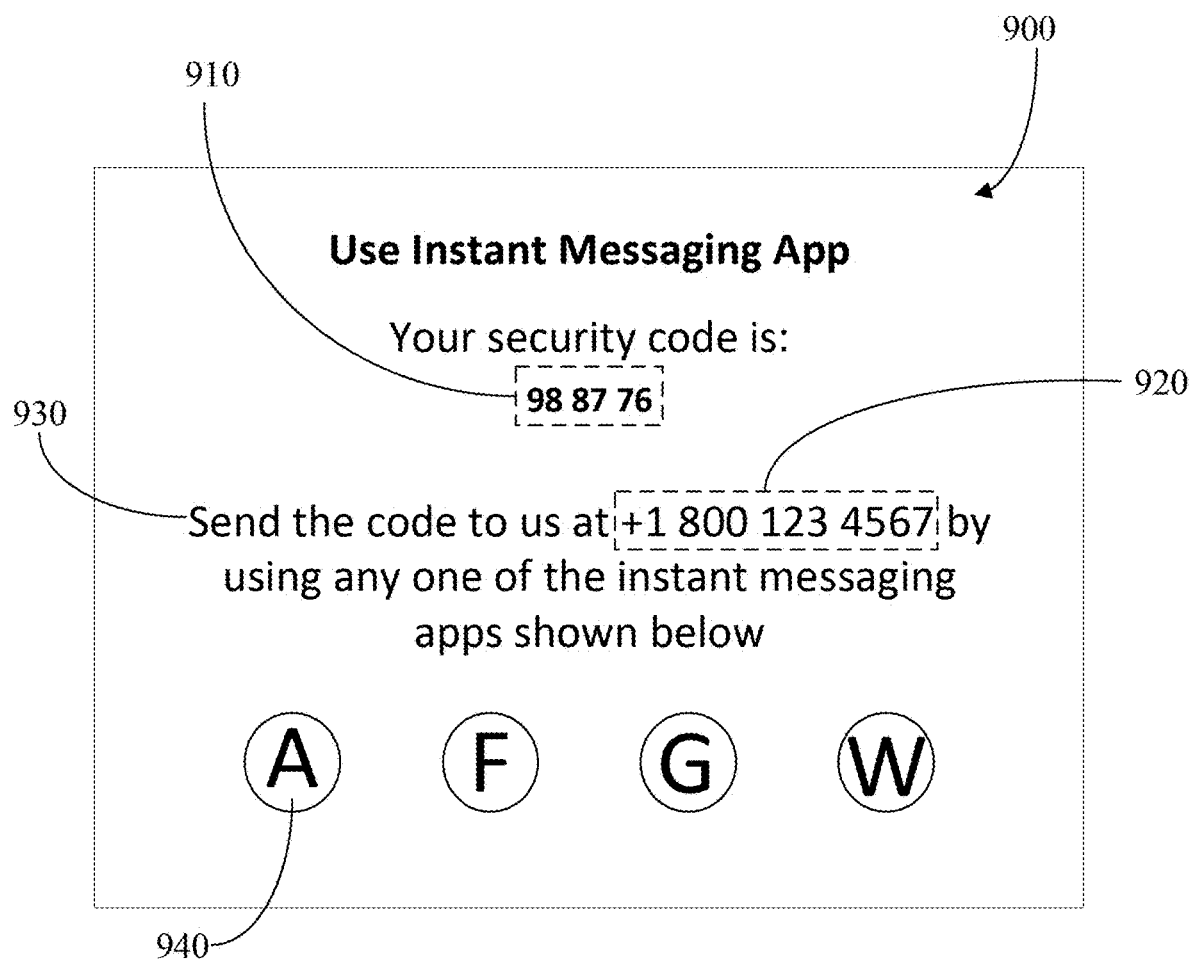
FIG. 9 is an example graphical user interface according to an embodiment.

In this embodiment, the authentication server 130 communicates a signal that, when received by the computing device 110, causes the computing device 110 to display a graphic user interface (GUI) in the form of a pop-up window. An example GUI 900 is shown in FIG. 9. As can be seen, the GUI 900 displays the unique code 910, the telephone number 920, and text 930 instructing the user how to complete the second factor authorization. The GUI 900 also displays icons 940 associated with a number of instant messaging applications or services that are supported by the system.

The authentication server 130 monitors at least one instant messaging account associated with the telephone number for the unique code (step 730). As mentioned, in this embodiment, the displayed telephone number is registered with a number of instant messaging accounts. Each instant messaging account is associated with a particular instant messaging service such as for example Google™ Talk, WhatsApp™, Facebook™ Messenger, etc. Each instant messaging service may be associated with an application server such as that described above. As mentioned, an icon of each supported instant messaging application may be shown in the GUI 900.

The authentication server 130 monitors incoming messages received at each of the instant messaging accounts associated with the displayed telephone number. When an instant message is received that includes a code containing numeric or alpha-numeric characters, the code is compared to the list of active unique codes to determine if there is a match.

Figure 10:
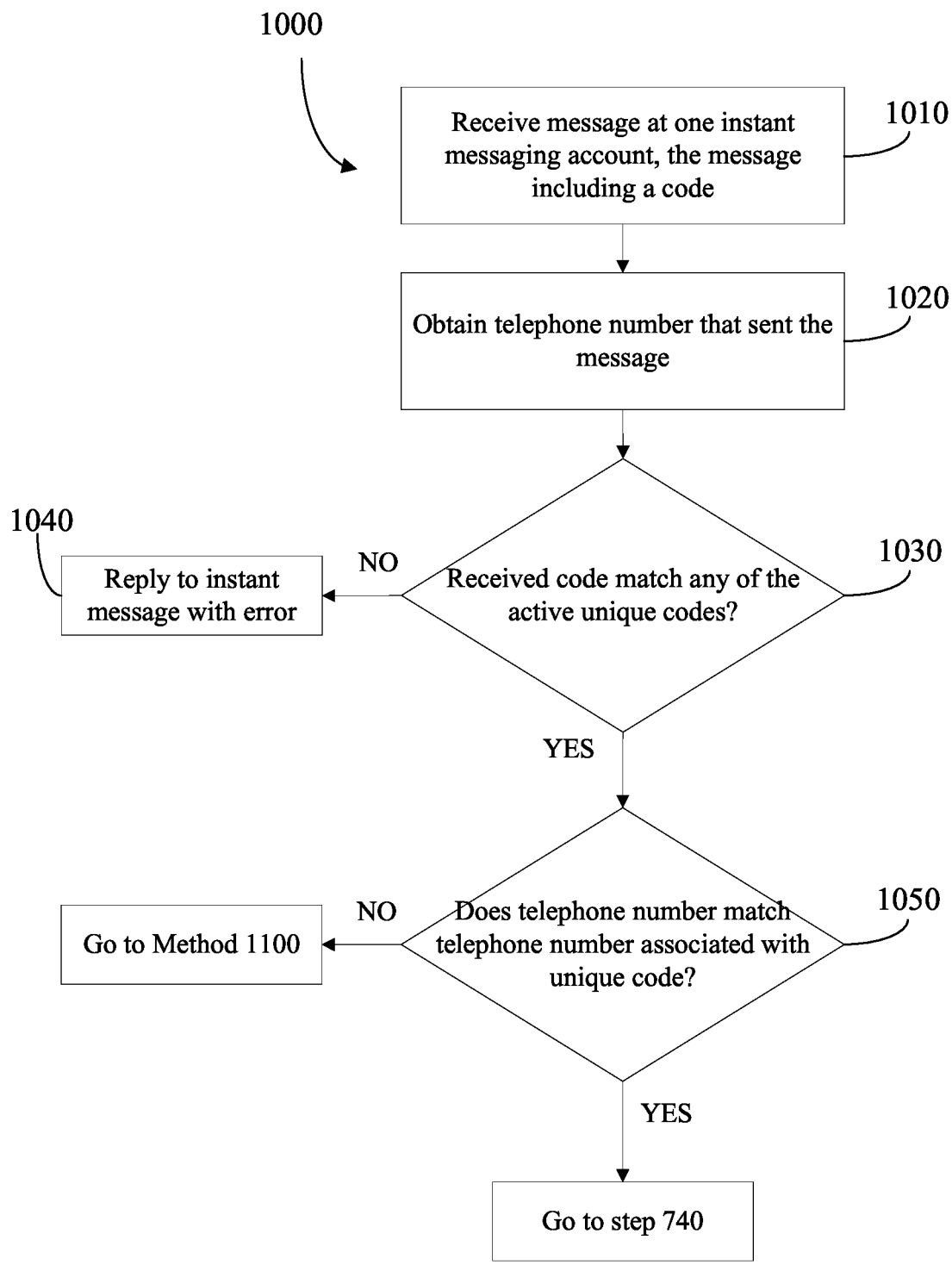
FIG. 10 is a flowchart showing operations performed by a server in performing a second factor authentication according to an embodiment.

FIG. 10 is a flowchart showing operations performed by the authentication server 130 to determine if there is a match between a received code and a unique code on the list of active unique codes according to an embodiment. The operations may be included in a method 1000 which may be performed by the authentication server 130. For example, computer-executable instructions stored in memory of the authentication server 130 may, when executed by a processor of the authentication server 130, configure the authentication server 130 to perform the method 1000 or a portion thereof.

Method 1000 begins when a message is received, by the authentication server 130, at one of the instant messaging accounts, the message including a code containing numeric or alpha-numeric characters (step 1010).

The telephone number that sent the received message is obtained (step 1020). In this embodiment, the message includes information indicating the telephone number that sent the message. The telephone number may be associated with the computing device 110 or the computing device 120. For example, the computing device 120 may be a mobile phone and may be used to send the instant message whereas the computing device 110 may be a laptop computing device and may be the device the user is attempting to log in with.

A check is performed to determine if the received code matches any one of the unique codes in the list of active unique codes (step 1030). When it is determined that the received code does not match any of the unique codes in the list of active unique codes, the authentication server 130 responds to the instant message, within an instant messaging chat interface, with an error message (step 1040). For example, the authentication server 130 may send a reply message indicating that "The code you sent us is not an active code. Please try again."

When it is determined that the received code matches a code on the list of active unique codes, the unique code is removed from the list of active unique codes and a check is performed to determine if the telephone number that sent the message is associated with the unique code (step 1050). In this embodiment, the telephone number that sent the message is compared to the telephone number stored in the list of active unique codes. When it is determined that the telephone number that sent the message matches the telephone number stored in the list of active unique codes, the second factor authentication is determined to be successful and the method continues to step 740 of method 700.

When it is determined that the telephone number that sent the message does not match the telephone number stored in the list of active unique codes, the authentication server 130 continues to a method 1100 to further authenticate the user.

Figure 11:
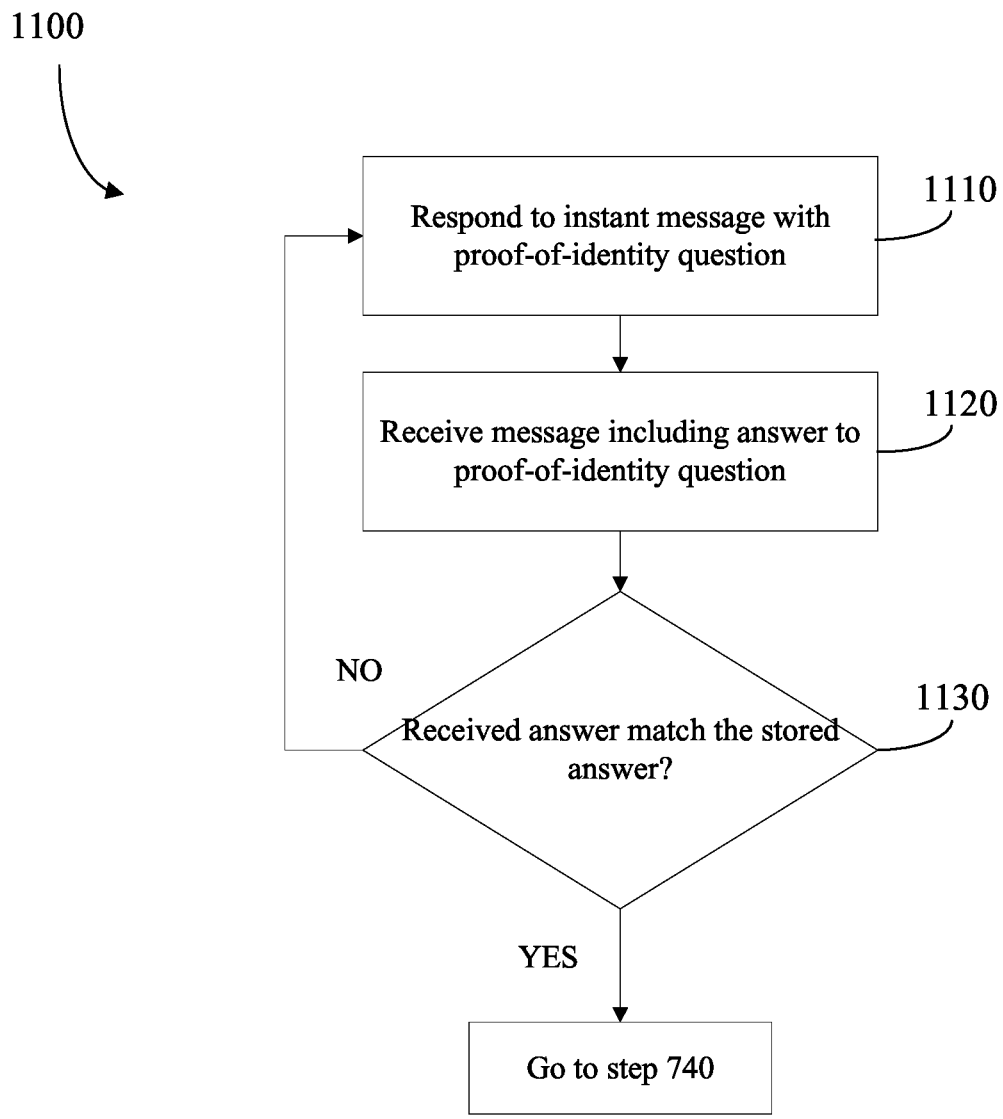
FIG. 11 is a flowchart showing operations performed by a server in performing a second factor authentication according to an embodiment.
Figure 12:
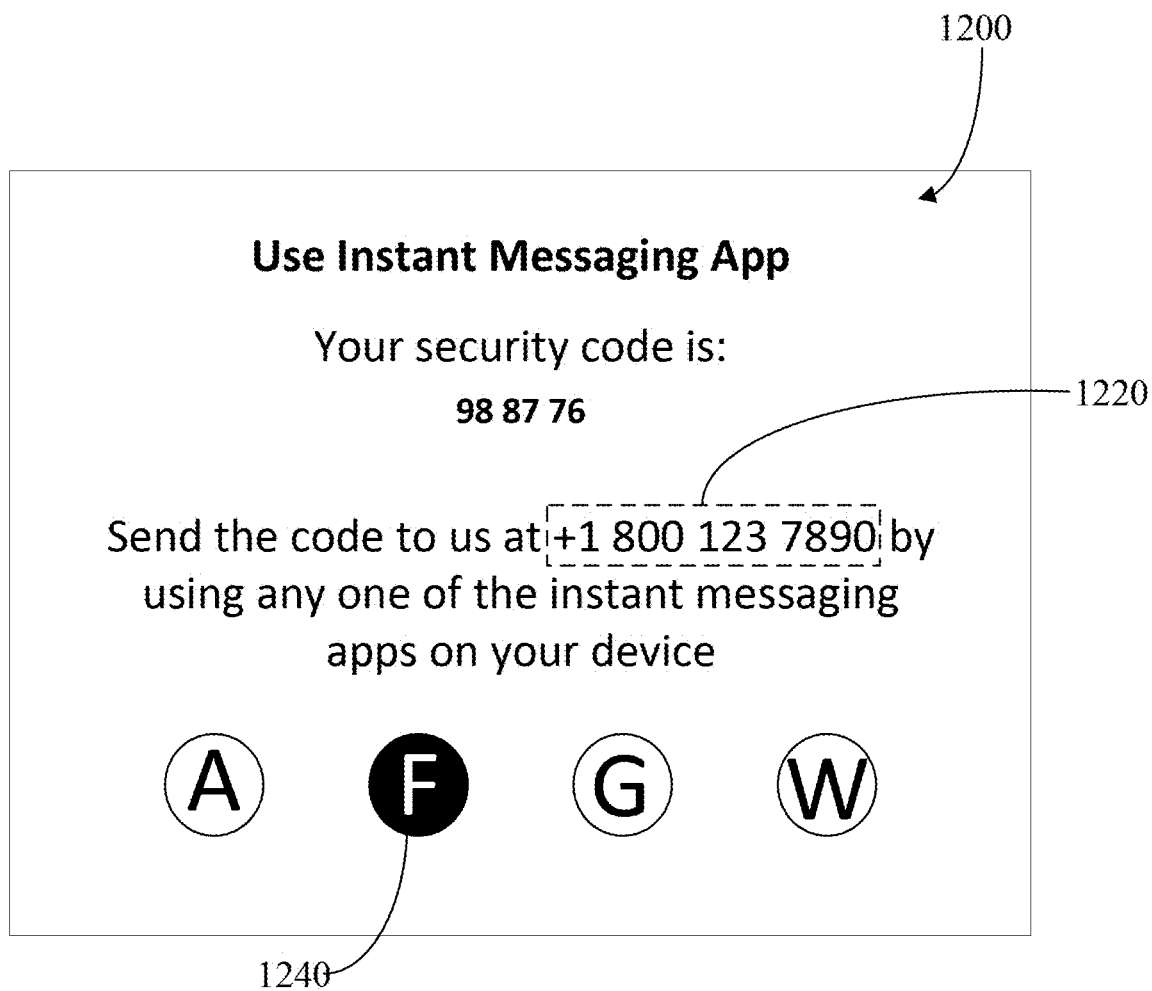
FIG. 12 is another example graphical user interface according to an embodiment.

FIG. 11 is a flowchart showing operations performed by the authentication server 130 to further authenticate the user. The operations may be included in a method 1100 which may be performed by the authentication server 130. For example, computer-executable instructions stored in memory of the authentication server 130 may, when executed by a processor of the authentication server 130, configure the authentication server 130 to perform the method 1100 or a portion thereof.

During method 1100, the authentication server 130 responds to the instant message, within the instant messaging chat interface, with a message that includes a proof-of-identity question (step 1110). In this embodiment, the proof-of-identity question is obtained from the stored proof-of-identity questions. An example of a proof-of-identity question may be "What is your mother's maiden name?" Another example of a proof-of-identity question may be "What is the make of your first car?" Answers to the proof-of-identity question may have been obtained during a set-up of the account the user is attempting to log into.

Within the instant messaging conversation, the authentication server 130 receives a message that includes an answer to the proof-of-identity question (step 1120). As will be appreciated, if no response is received after a predefined amount of time, an error message may be sent within the instant messaging chat interface in a manner similar to step 1030 described above.

A check is performed to determine if the answer to the proof-of-identity question matches the answer previously stored by the authentication server 130 (step 1130). When it is determined that the answer to the proof-of-identity question matches the answer previously stored by the authentication server 130, the second factor authentication is determined to be successful and the method continues to step 740 of method 700.

When it is determined that the answer to the proof-of-identity question does not match the answer previously stored by the authentication server 130, the method returns to step 1110 where another proof-of-identity question is sent. This may repeat a predefined number of times, such as for example two or three times, before an error message is sent in a manner similar to step 1030 described above.

Referring back to FIG. 7, the authentication server 130 determines that the second factor authentication is successful (step 740). As mentioned, second factor authentication for the particular account is determined to be successful when it is determined that the telephone number that sent the message that included the unique code matches the telephone number stored in the list of active unique codes (FIG. 10) or when it is determined that the answer to the proof-of-identity question matches the answer previously stored by the authentication server 130 (FIG. 11).

Referring back to FIG. 5, when the second factor authentication is determined to be successful, the authenticated session is initiated (step 530). In this embodiment, the authenticated session that is initiated may be a mobile banking session.

Although in embodiments described above, the displayed telephone number is described as being associated with a number of instant messaging applications, those skilled in the art will appreciate that alternatives are available. For example, in another embodiment, the authentication server 130 may be associated with a number of telephone numbers, each of which is associated with a particular instant messaging account. In this embodiment, a GUI 1200 is displayed on the computing device 110, similar to GUI 900 described above. The GUI 1200 allows the user to select an icon 1240 to choose which instant messaging service they intend to send the instant message from. The telephone number 1220 associated with the selected instant messaging service may be displayed in the GUI 1200. The telephone number 1220 changes based on what instant messaging service is selected.

In this embodiment, the authentication server 130 may initiate an authenticated session in a manner similar to that described above with the following exception. In this embodiment, during step 720 of method 700, the authentication server 130 may display, at the computing device, the unique code and a telephone number, the telephone number being based on which icon 1240 has been selected by the user.

Figure 13A:
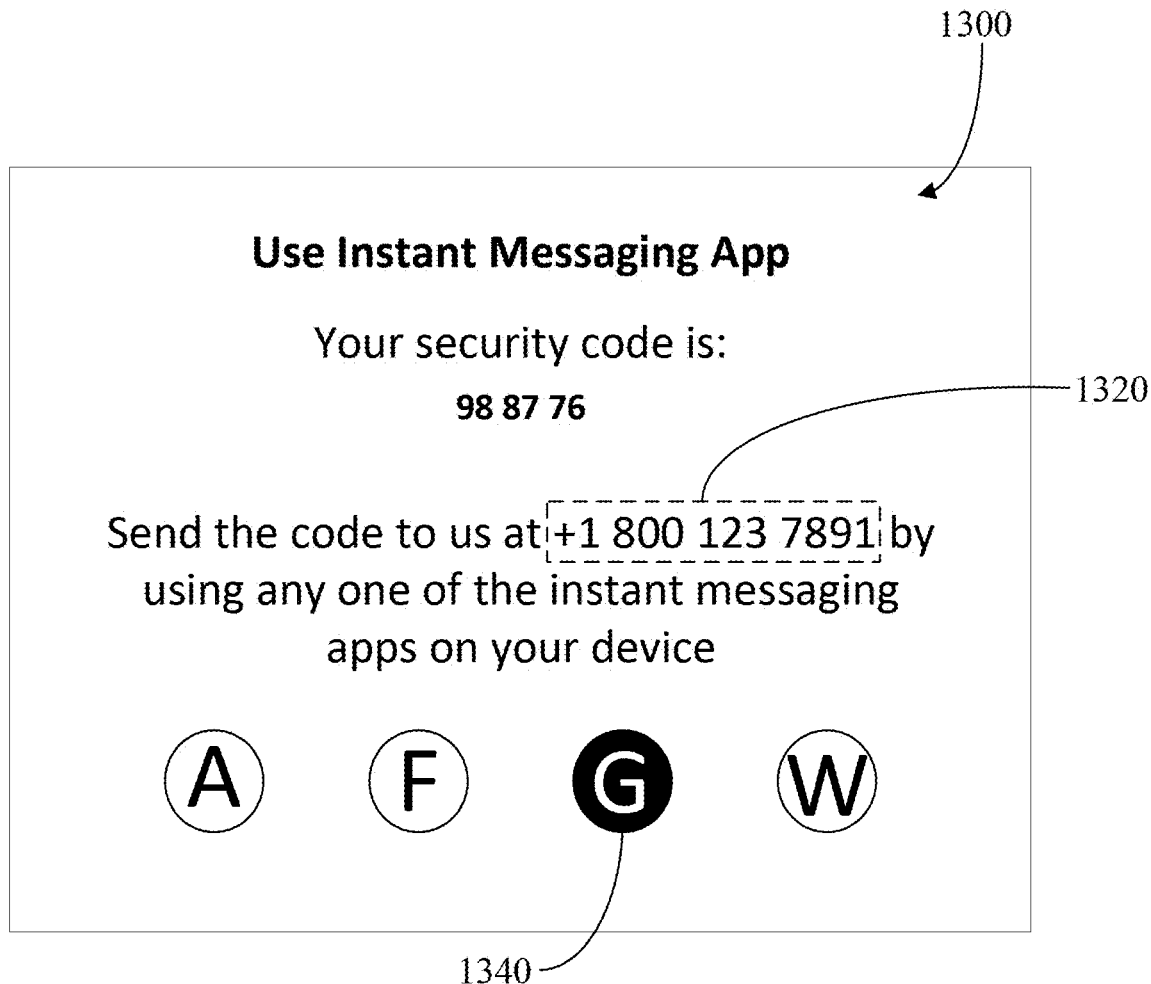
FIG. 13A is another example graphical user interface according to an embodiment.
Figure 13B:
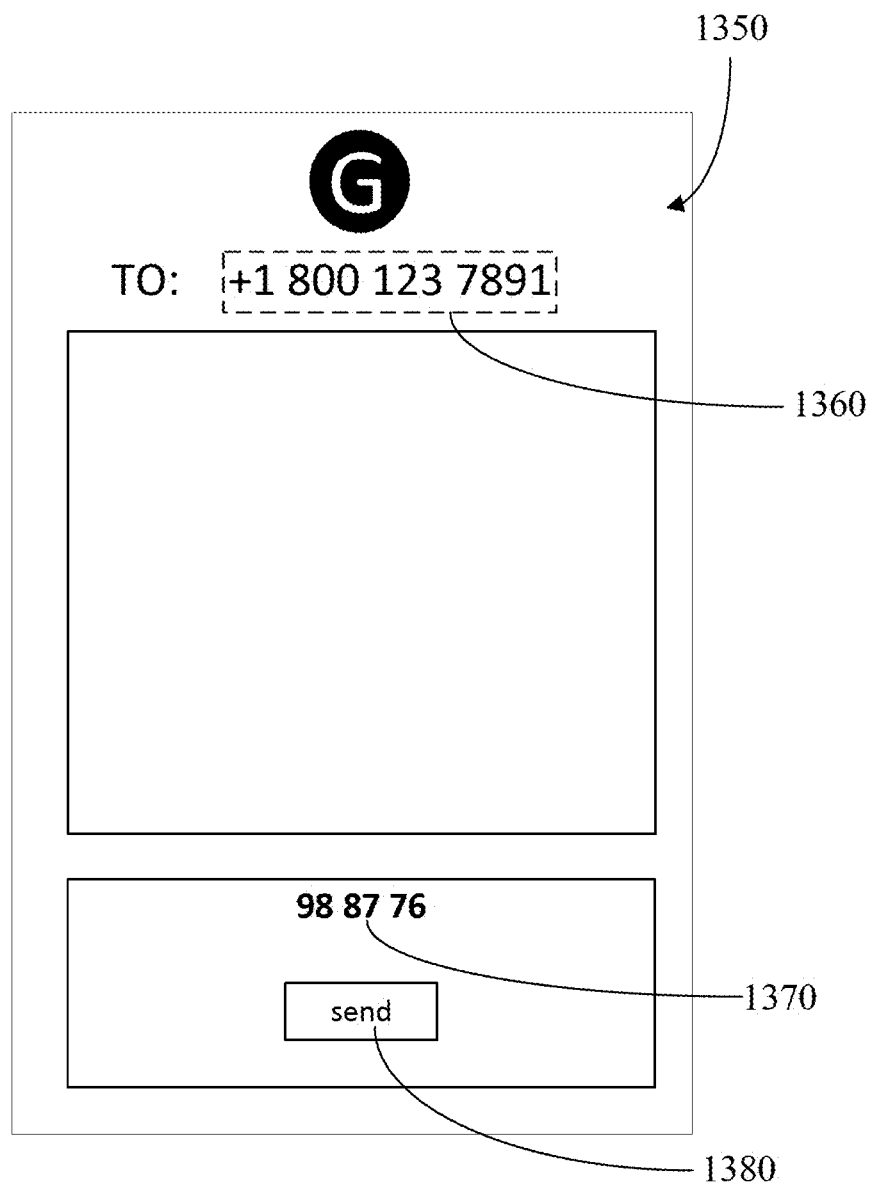
FIG. 13B is another example graphical user interface according to an embodiment.

In another embodiment, when the user selects an icon, the authentication server 130 may automatically link or hyperlink to the selected instant messaging application and populate an instant message. An example is shown in FIGS. 13A and 13B. As can be seen, a GUI 1300 is displayed on the computing device 110, similar to GUI 900 described above. The GUI 1300 allows the user to select an icon 1340 to choose which instant messaging service they intend to send the instant message from. In response to the user selecting the icon 1340, the authentication server 130 sends a signal to the computing device 110, 120, the signal causing the computing device 110, 120 to open an application associated with the selected icon 1340. The signal also causes the computing device 110, 120 to populate an instant message to complete the second factor authentication. An example is shown in FIG. 13B. As can be seen, an instant message is automatically generated and displayed as a GUI 1350. The automatically generated instant message includes the recipient information 1360 based on the displayed telephone number 1320. The text of the instant message to be sent is automatically generated such that the unique code 1370 is entered as input to the instant messaging conversation. The user is required to send the automatically generated instant message by pressing a displayed button 1380 to submit the unique code in an attempt to complete the second factor authentication. As will be appreciated, the second factor authentication may be completed using the embodiments described above.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
register a telephone number with a plurality of instant messaging accounts associated with a plurality of instant messaging services;
send, via the communications module and to a remote computing device, a signal causing the remote computing device to display a unique code and the telephone number;
monitor the instant messaging accounts for the unique code;
after determining that the unique code has been received at one of the instant messaging accounts, determine that authentication for a particular account has been successful; and
in response to determining that authentication for the particular account has been successful, initiate an authenticated session.

2. The server of claim 1, wherein the authentication includes a two-factor authentication and the signal causing the remote computing device to display the unique code and the telephone number is sent after a successful first factor authentication of the particular account.

3. The server of claim 2, wherein the first factor authentication includes receiving one or more credentials associated with the particular account, the one or more credentials including at least one of a username, a password, a fingerprint scan and a facial scan.

4. The server of claim 1, wherein the processor-executable instructions, when executed by the processor, further configure the processor to:
send, via the communications module and to the remote computing device, a signal causing the remote computing device to display the unique code for a predefined amount of time; and
after the predefined amount of time, send, via the communications module and to the remote computing device, a signal causing the remote computing device to display a new unique code.

5. The server of claim 1, wherein the processor-executable instructions, when executed by the processor, further configure the processor to:
add the unique code to a list of active unique codes; and
remove the unique code from the list of active unique codes in response to one of:
determining that authentication for the particular account has been successful; and
an expiry of a predefined amount of time.

6. The server of claim 1, wherein the processor-executable instructions, when executed by the processor, further configure the processor to:
after determining that the unique code has been received at one of the instant messaging accounts, determine that the unique code was received from an instant messaging account associated with a telephone number registered with the particular account.

7. The server of claim 6, wherein the authentication for the particular account is determined to be successful in response to determining that the unique code was received from the instant messaging account associated with the telephone number registered with the particular account.

8. The server of claim 1, wherein the processor-executable instructions, when executed by the processor, further configure the processor to:

after determining that the unique code has been received at one of the instant messaging accounts, determine that the unique code was not received from an instant messaging account associated with a telephone number registered with the particular account; and in response to determining that the unique code was not received from an instant messaging account associated with a telephone number registered with the particular account, send one or more proof-of-identity questions to the instant messaging account from which the unique code was sent.

9. The server of claim 8, wherein the one or more proof-of-identity questions are sent within a chat interface between the one of the instant messaging accounts and the instant messaging account from which the unique code was sent.

10. The server of claim 8, wherein determining that the authentication for the particular account has been successful is performed in response to successful verification of one or more answers to the one or more proof-of-identity questions.

11. A computer-implemented method comprising:

registering a telephone number with a plurality of instant messaging accounts associated with a plurality of instant messaging services;

sending, via a communications module and to a remote computing device, a signal causing the remote computing device to display a unique code and the telephone number;

monitoring the instant messaging accounts for the unique code;

after determining that the unique code has been received at one of the instant messaging accounts, determining that authentication for a particular account has been successful; and in response to determining that authentication for the particular account has been successful, initiating an authenticated session.

12. The computer-implemented method of claim 11, wherein the authentication includes a two-factor authentication and the signal causing the remote computing device to display the unique code and the telephone number is sent after a successful first factor authentication of the particular account.

13. The computer-implemented method of claim 12, wherein the first factor authentication includes receiving one or more credentials associated with the particular account, the one or more credentials including at least one of a username, a password, a fingerprint scan and a facial scan.

14. The computer-implemented method of claim 11, further comprising:

sending, via the communications module and to the remote computing device, a signal causing the remote computing device to display the unique code for a predefined amount of time; and after the predefined amount of time, sending, via the communications module and to the remote computing device, a signal causing the remote computing device to display a new unique code.

15. The computer-implemented method of claim 11, further comprising:

after determining that the unique code has been received at one of the instant messaging accounts, determining that the unique code was received from an instant messaging account associated with a telephone number registered with the particular account.

16. The computer-implemented method of claim 15, wherein the authentication for the particular account is determined to be successful in response to determining that the unique code was received from the instant messaging account associated with the telephone number registered with the particular account.

17. The computer-implemented method of claim 11, further comprising:

after determining that the unique code has been received at one of the instant messaging accounts, determining that the unique code was not received from an instant messaging account associated with a telephone number registered with the particular account; and in response to determining that the unique code was not received from an instant messaging account associated with a telephone number registered with the particular account, sending one or more proof-of-identity questions to the instant messaging account from which the unique code was sent.

18. The computer-implemented method of claim 17, wherein the one or more proof-of-identity questions are sent within a chat interface between the instant messaging account associated with the displayed telephone number and the instant messaging account from which the unique code was sent.

19. The computer-implemented method of claim 17, wherein determining that the authentication for the particular account has been successful is performed in response to successful verification of one or more answers to the one or more proof-of-identity questions.

20. A non-transitory computer readable storage medium comprising computer-executable instructions which, when executed, configure a processor to:

register a telephone number with a plurality of instant messaging accounts associated with a plurality of instant messaging services;

send, via a communications module and to a remote computing device, a signal causing the remote computing device to display a unique code and the telephone number;

monitor the instant messaging accounts for the unique code;

after determining that the unique code has been received at one of the instant messaging accounts, determine that authentication for a particular account has been successful;

in response to determining that authentication for the particular account has been successful, initiate an authenticated session.

\* \* \* \* \*